United States Patent [19]

Myles

[11] 4,199,992
[45] Apr. 29, 1980

[54] PRESSURE INDICATOR

[75] Inventor: J. Edgar Myles, Bloomfield, Mich.

[73] Assignee: J. E. Myles, Inc., Troy, Mich.

[21] Appl. No.: 31,270

[22] Filed: Apr. 18, 1979

Related U.S. Application Data

[63] Continuation of Ser. No. 945,762, Sep. 25, 1978, abandoned.

[51] Int. Cl.$^2$ .............................................. G01L 7/16
[52] U.S. Cl. ..................................................... 73/744
[58] Field of Search .............. 73/744, 745, 746, 146.8, 73/146.3

[56] References Cited

U.S. PATENT DOCUMENTS

| | | | |
|---|---|---|---|
| 3,286,726 | 11/1966 | Guy | 73/744 |
| 3,677,089 | 7/1972 | Martin | 73/744 |
| 3,910,120 | 10/1975 | Martin | 73/744 |

Primary Examiner—Donald O. Woodiel
Attorney, Agent, or Firm—Cullen, Sloman, Cantor, Grauer, Scott & Rutherford

[57] ABSTRACT

The pressure indicator has a body provided with an attachment shank having a pressure fluid passage. A cylinder bore is located at one end of the body communicating with the passage and has a threaded open end. An end plug having a bore and a counterbore is snugly threaded into the open end. A piston is nested in the cylinder bore and has a piston rod axially extending through the cylinder bore and projecting through and outwardly of the plug. A compression spring is interposed between the plug and piston and yieldably biases the piston towards said one end of the cylinder bore. The piston is variably movable longitudinally against the spring on application of pressure to the shank passage. The improvement resides in the provision of a bushing nested within the plug bore which axially and guidably receives the piston rod. A cylindrical slide seal of plastic material is nested within the plug bore and projects into and depends from the bushing in sealing engagement with the piston rod. An O-ring in the plug bore is sealingly interposed between the plug and the slide seal. The piston and bushing are of different material to eliminate binding therebetween. A modification includes a shut-off needle valve mounted on the body.

13 Claims, 5 Drawing Figures

U.S. Patent  Apr. 29, 1980  Sheet 1 of 2  4,199,992

PRESSURE INDICATOR

RELATED APPLICATION

This application is a continuation of application Ser. No. 945,762, filed Sept. 25, 1978 by J. Edgar Myles, now abandoned.

BACKGROUND OF THE INVENTION

Pressure indicators of the type disclosed are known to include metallic body with a threaded attachment shank having a pressure fluid passage adapted for connection to a source of pressure to be measured. A cylindrical bore is provided within the body which communicates with the passage and has a threaded open end receiving an end plug having a bore and which is threaded into the body. A piston is nested in the cylinder and has a piston rod axially extending through the cylinder bore and through the plug and a compression spring is interposed between the plug and piston retainingly engaging the piston and the piston being variably movable longitudinally against the spring on application of pressure with the extent of movement providing a visual indication of the pressure applied. Examples of this type of pressure indicator as shown in U.S. Pat. Nos.: 3,677,089 and 3,910,120.

In constructions of this type wherein the pressure indicator may be subjected to pressures up to 5,000 PSIG, the problem has long existed of providing a guide bearing and seal for the movable end of the piston rod within the indicator body so as to eliminate binding to, thus, provide an accurate reading of the pressure applied to the pressure indicator.

SUMMARY OF THE INVENTION

It is an object of the present invention to provide an improved guide and seal mechanism for the piston rod within the pressure indicator to eliminate or minimize binding of the piston rod with respect to its guide and sealing means.

It is a further object to provide the piston rod of a material different from the guide and sealing means therefor. For example, the piston rod may be constructed of stainless steel or stainless steel which has been nickel-plated and which has a micro-finish and wherein the bearing or bushing is of brass and the sealing sleeve is of a plastic material.

It is a further object of the present invention to provide an improved pressure indicator which has an integral shut-off needle valve applied thereto.

These and other objects will be seen from the following specification and claims in conjunction with the appended drawings.

THE DRAWINGS

It will be understood that the above drawings illustrate merely preferred embodiments of the invention, and that other embodiments are contemplated within the scope of the claims hereafter set forth.

DETAILED DESCRIPTION OF THE INVENTION

Figure 1:
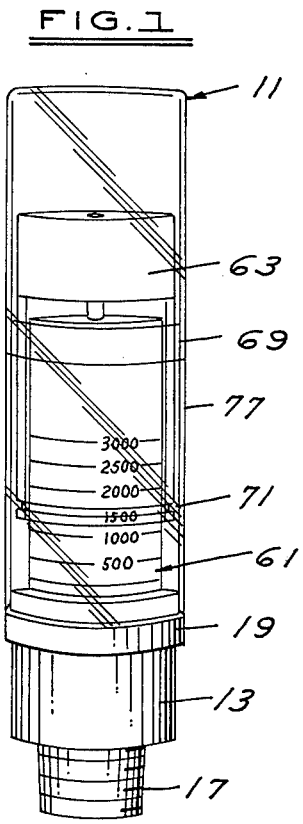
FIG. 1 is a front perspective view of the present pressure indicator.
Figure 2:
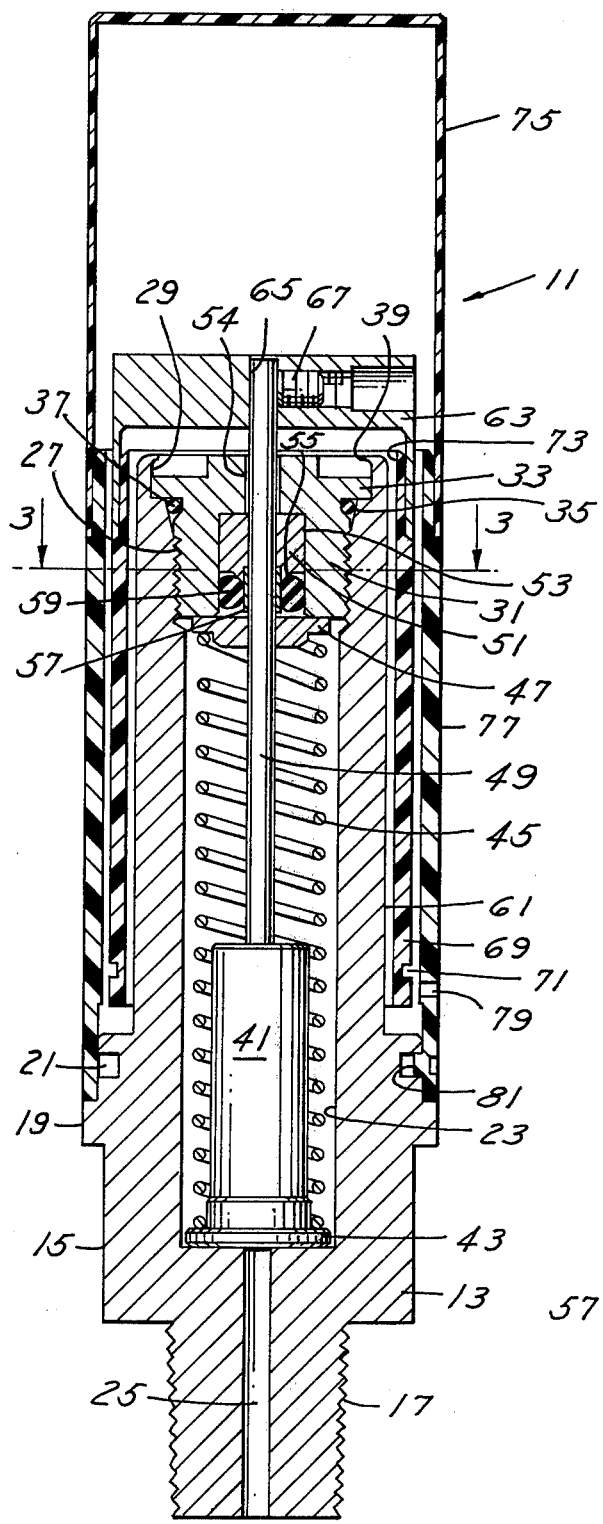
FIG. 2 is a vertical section thereof, on an increased scale.
Figure 3:
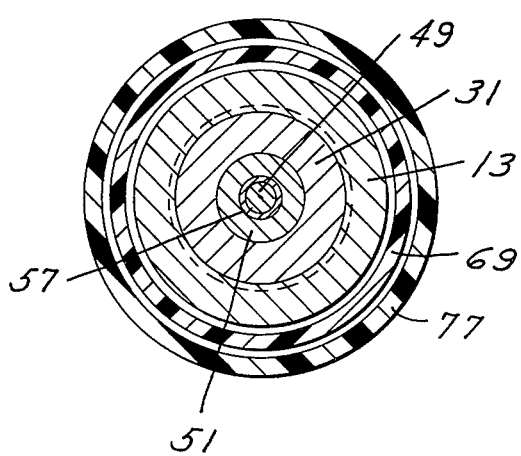
FIG. 3 is a section taken in the direction of arrows 3—3 of FIG. 2.

Referring to the drawings, the pressure indicator or guage is designated at 11 in FIGS. 1 and 2, and includes an elongated metallic body 13 of cylindrical form having adjacent its lower end on opposite sides thereof a pair of wrench-engaging flats or flat surfaces 15. The body 13 terminates in the threaded assembly shank 17 having therethrough pressure fluid passage 25.

The body 13 includes adjacent the flats 15, an annular stop shoulder 19 and thereabove an annular groove 21 and includes an elongated cylinder bore 23. The upper end of the body 13 has a threaded bore 27 and outwardly thereof a counterbore 29 of increased radius.

End plug 31 is snugly threaded into bore 27 and includes across its top a transverse flange 33 of increased radius. The flange 33 is nested within the counterbore 29 and bears against the adjacent shoulder 34, FIG. 4.

Below the shoulder 34 is an annular inwardly extending tapered surface 35 which is spaced from the plug 31. Within said space and under compression is the O-ring 37 which is snugly interposed between the tapered surface 35 and the plug 31 engaging and being located below top flange 33. This completes the seal between the plug 31 and the body 13.

The upper end of the body 13 adjacent its counterbore 39 has an inturned-portion or stop 39 which is adapted to limit relative outward movement of the flange 33 and plug 13 should an excessive pressure be so applied to the plug. In the event the gauge 11 is over-pressurized, the top flange 33 will open to the stop 39 allowing the overpressure to relieve over a controlled orifice area. This provides a safety relief valve feature preventing uncontrolled explosion or missiling in the event the gauge 11 is over-pressurized.

In the present construction, the plug 31 and the threading therein is constructed to have an excessive shear strength such that, the flange 33 of the plug 31 would actually bend before the threads sheared. The pressure indicator 11 has been tested to withstand pressures up to 10,000 PSIG. The normal range of measurement is between 30 inches Hg and 5,000 PSIG in the present embodiment.

Nested within the bore 23 of the body 13 is the elongated piston 41 having at one end the enlarged spring seat 43 of annular form and which supportably engages compression spring 45. The spring 45 is disposed around the piston 41 and is interposed between seat 43 and the apertured spring keeper 47 which underlies plug 31.

The elongated piston rod 49 extends axially of and is an integral part of the piston 41 and is adapted to extend up through plug 31 and the bearing and seal therein and outwardly of the end of the body 13.

The end plug 31 has a bore 53 and a counterbore 54. Bearing or bushing 51 is nested within bore 53 and has an axial bore 52 to slidably receive the piston rod 49. To minimize or prevent binding between the piston rod 49 and bearing 51 these members are constructed of different materials.

In the illustrative embodiment and preferred form, the bearing 51 is constructed of brass and the piston rod 49 is of stainless steel and has a micro-finish thereon reducing friction and binding. Alternately, the piston rod 49 has a nickle-plating thereon and is highly polished with a micro-finish for this same purpose. The lower end of the bearing 51 has a downwardly and inwardly inclined annular portion 55.

Figure 4:
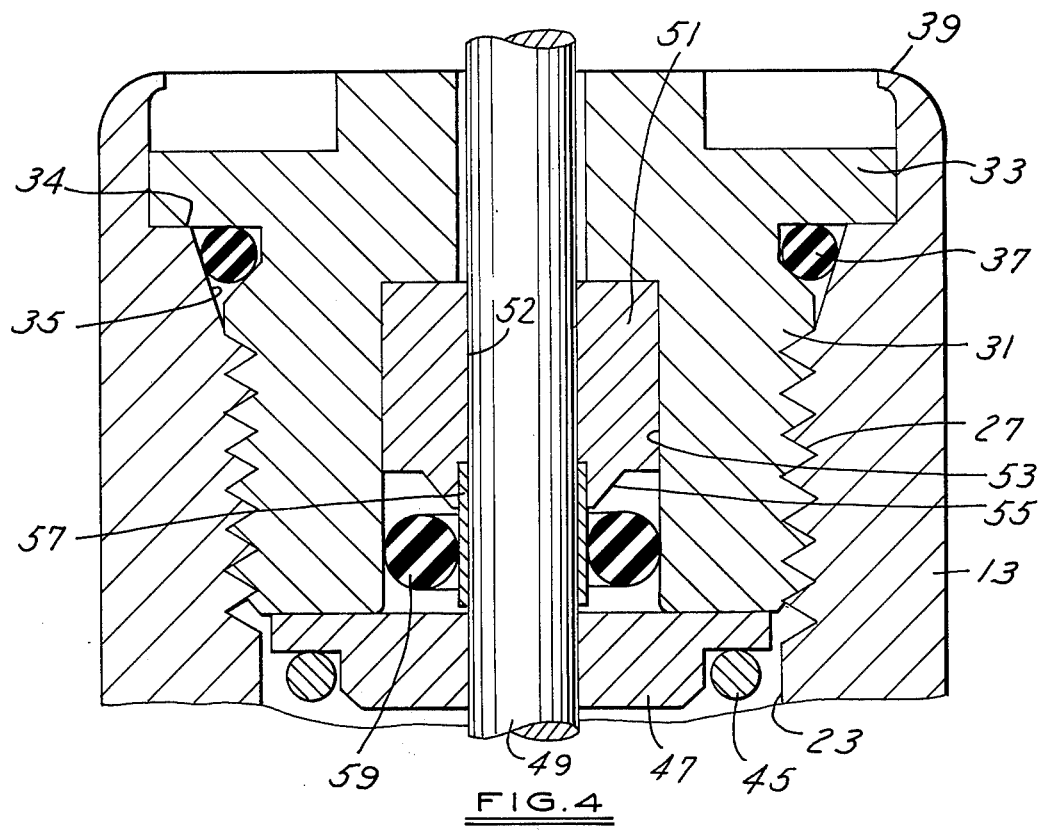
FIG. 4 is a fragmentary elevational section corresponding to FIG. 2 on an increased scale and illustrating the bearing and seal relation to the reciprocal piston rod.

Elongated sealing sleeve 57 of a plastic material as, for example, Teflon is snugly and frictionally projected up into the lower end portion of the bearing 51 and cooperatively and sealing receives piston rod 49 as shown on an enlarged scale in FIG. 4. O-ring seal 59 is interposed in compression between the plug 31 and the sealing sleeve 57 to establish a further seal between the rod 49 and the plug 31 and to prevent the escape of pressure from the interior of the cylinder bore 23.

Applied to the exterior surface of the body 13 is the upright scale 61 for measuring pressures between 80 and 5,000 PSIG. In the illustration shown in FIG. 1, the scale indicates merely the pressures 500 to 3,000 PSIG. Additional scales 61 are also applied to the body 61, being 90-degree related thereoroud whereby, pressure indications may be read throughout 360 degrees. In the present invention, the scale 61 may be replaced to read vacuum up to 30 inches of mercury.

The downwardly opening annular indicator cap 63 has an axial bore 65 receiving the piston rod 49. The cap 63 is secured to the piston rod 49 by the transverse set screw 67, FIG. 2. Elongated upright transparent scale indicator sleeve 69 of a plastic material, at its upper end projects up into the cap 63 and is secured thereto. The indicator sleeve 69 is arranged outwardly of the upper end of the body 13 therearound, overlies the respective scale or scales 61 and has adjacent its lower end the annular scale reader slot 71.

Accordingly upon the application of pressure to the passage 25, there will be a corresponding upward movement of the piston 41 and associated piston rod 49 compressing the spring 45 and effecting a corresponding longitudinal movement of the scale indicator sleeve 69. So variably elevated depending upon the pressures applied, there can be a direct visual reading of the scales 61 through the annular indicator slot 71 viewed from any direction throughout 360 degrees.

The upper end of the scale indicator sleeve 69 has an annular assembly flange 73 which is frictionally or otherwise projected up into the depending flange of the cap 63 so that the indicator sleeve 69 moves in unison with longitudinal adjustments of piston rod 49.

A cylindrical enlarged top enclosure 75 of a plastic material is mounted over and around the body and outwardly of the indicator sleeve 69 surrounding the same. The upper portion of top enclosure 75 may be opaque whereas, the lower part of the enclosure 75 includes plastic transparent enclosure member 77 as a part of or connected to top closure 75. The lower end of the enclosure element 77 includes an internal boss 81 which, in the position shown in FIG. 2, is snapped into and interlocked within annular assembly groove 21 upon the exterior of the body 13, FIG. 2.

A vent aperture 79 is provided through the lower portion of the closure element 77 to permit the movement of atmospheric air to and from the interior of the enclosure upon vertical adjustments of the indicator sleeve 69 and attached cap 63 to avoid any compression of air there within the top enclosure 75-77.

The present pressure indicator may be used for testing the pressure of oils, water, gas, air at high and low temperatures and involving corrosive atmospheres. With piston 41 and spring 45 reversed, the indicator 11 may read vacuum up to 30 inches mercury, for illustration.

MODIFICATION

Figure 5:
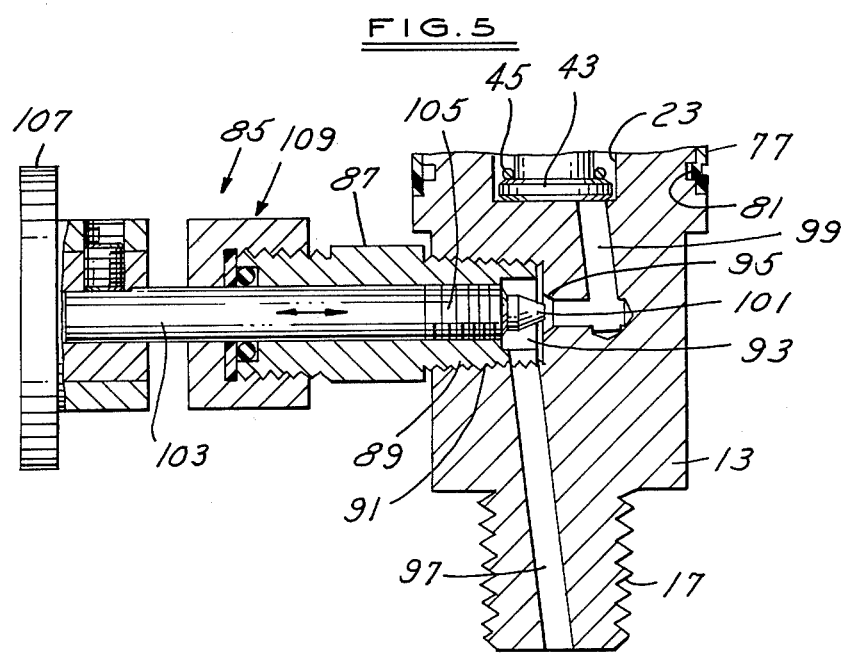
FIG. 5 is a fragmentary vertical section showing a modification of the pressure indicator of FIG. 1 incorporating a shut-off needle valve.

FIG. 5 fragmentarily illustrates the present body 13 above described with respect to FIG. 2 and which includes the manual shut-off needle valve assembly 85. The shut off assembly 85 includes the body 87 which extends radially of indicator body 13 and has a threaded shank 89 which extends into the radial interiorly threaded bore 91 in the pressure indicator body 13. The body 13 includes the chamber 93 having valve seat 95 and the communicating passage 99 which extends up to the cylinder bore 23.

The shank 17 has a pressure fluid passage 97 corresponding to the passage 25 of FIG. 2 and which communicates with the chamber 93 for providing pressure thereto when the indicator has been assembled over an apertured portion of a body from which communication is established to a source of pressure fluid to be measured. The needle valve 101 is positioned within the chamber 93 and is arranged axially of the elongated shank 103 which is threaded at 105 into body 87 and includes the exterior handle 107. Seal assembly 109 receives shank 103 and is threaded over a portion of the body 87 with a suitable seal interposed.

Needle valve 101 shown in FIG. 5 as spaced from seat 95 is adapted for movements relative to the seat 95 and into engagement with the seat 95 for closing off the flow of pressure fluid through the passages 97 and 99.

Having described my invention, reference should now be had to the following claims.

I claim:

1. In a pressure indicator having a body with an attachment shank with a pressure fluid passage, a cylinder bore at one end communicating with said passage and having a threaded open end, an end plug having a bore and a counterbore snugly threaded into said open end, a piston nested in said cylinder bore having a piston rod axially extending through said cylinder bore and projecting through and outwardly of said plug, and a compression spring interposed at its ends between said plug and piston yieldably biasing said piston towards said one end of said cylinder bore, said piston being variably movably longitudinally against said spring on application of pressure to said pressure fluid passage, the improvement comprising:

a bushing nested within said plug bore axially and guidably receiving said piston rod;

a cylindrical slide seal of plastic material within said plug bore and projected into and depending from said bushing in sealing engagement with said piston rod; and an O-ring seal in said plug bore sealingly interposed between said plug and slide seal.

2. In the pressure indicator of claim 1, said piston rod being of a material different from said bushing thereby eliminating binding therebetween.

3. In the pressure indicator of claim 1, said piston rod being of stainless steel.

4. In the pressure indicator of claim 1, said piston rod having a highly polished microfinish.

5. In the pressure indicator of claim 1, a nickel-plated layer applied to said piston rod.

6. In the pressure indicator of claim 1, said piston rod extending from and being an integral part of said piston.

7. In the pressure indicator of claim 1, said body outwardly of its threaded end having a counterbore of increased diameter defining a stop shoulder;
a transverse top flange on said end plug nested in the counter bore of said body and bearing against said shoulder;
end portions of said body at said counter bore being inturned limiting relative outward movement of said top flange relative to said body, whereby application of an over-pressure to said plug is relieved over a controlled orifice area providing a safety relief.

8. In the pressure indicator of claim 7, said body longitudinally inward of said shoulder having an annular tapered surface spaced from said plug below said top flange;
and an O-ring seal compressively nested between said tapered surface and plug.

9. In the pressure indicator of claim 1, an upright scale imprinted upon the exterior of said body longitudinally thereof indicating PSIG;
a downturned cap axially receiving and secured to the end of said piston rod, surrounding and spaced outwardly of said body at its upper end;
a transparent cylindrical scale indicator secured to and depending from said cap surrounding said body;
and an annular scale reader groove formed in said scale indicator registering along the height of said scale for directly reading the pressure applied to said body passage.

10. In the pressure indicator of claim 9, there being a series of 90-degree spaced additional scales imprinted on and around said body for readability of pressures throughout 360 degrees.

11. In the pressure indicator of claim 9, there being an annular groove formed in said body adjacent the shank end thereof;
and a cylindrical enclosure having a transparent portion loosely receiving said scale indicator with its open end bearing against said body adjacent said annular groove;
and an internal boss on said enclosure snap-interlocked within said annular groove.

12. In the pressure indicator of claim 1, a shut-off needle valve assembly mounted upon said body adjacent its shank extending radially thereof;
and including a manually adjustable needle valve element normally closing off said shank passage.

13. In the pressure indicator of claim 12, a chamber in said body communicating with said passage and cylinder bore having a valve seat;
said needle valve element adapted for registry with said seat and for adjustments outwardly thereof.

* * * * *